US012538941B2

(12) United States Patent
Wu et al.

(10) Patent No.: US 12,538,941 B2
(45) Date of Patent: Feb. 3, 2026

(54) AEROSOL PRODUCING ARTICLE AND AEROSOL GENERATING SYSTEM

(71) Applicant: SHENZHEN FIRST UNION TECHNOLOGY CO., LTD., Shenzhen (CN)

(72) Inventors: Jian Wu, Shenzhen (CN); Zuqiang Qi, Shenzhen (CN); Jiamao Luo, Shenzhen (CN); Baoling Lei, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 572 days.

(21) Appl. No.: 17/792,702

(22) PCT Filed: Jan. 12, 2021

(86) PCT No.: PCT/CN2021/071322

§ 371 (c)(1),
(2) Date: Jul. 13, 2022

(87) PCT Pub. No.: WO2021/143688

PCT Pub. Date: Jul. 22, 2021

(65) Prior Publication Data

US 2023/0048161 A1 Feb. 16, 2023

(30) Foreign Application Priority Data

Jan. 13, 2020 (CN) ......................... 202020066742.5

(51) Int. Cl.
*A24D 1/02* (2006.01)
*A24D 1/04* (2006.01)
(Continued)

(52) U.S. Cl.
CPC ............... *A24D 1/027* (2013.01); *A24D 1/04* (2013.01); *A24D 1/20* (2020.01); *A24D 3/17* (2020.01);
(Continued)

(58) Field of Classification Search
CPC ........................................................ A24D 1/20
See application file for complete search history.

(56) References Cited

U.S. PATENT DOCUMENTS 5,967,148 A 10/1999 Harris et al.
11,346,051 B2 * 5/2022 Luxenbourg ........... D21H 21/14
(Continued)

FOREIGN PATENT DOCUMENTS

CN 104188108 A * 12/2014
CN 204180942 U 3/2015
(Continued)

OTHER PUBLICATIONS

CN 104188108 Machine Translation (Year: 2024).*
Machine Translation of CN 104188108 (Year: 2025).*

*Primary Examiner* — Russell E Sparks
(74) *Attorney, Agent, or Firm* — Cheng-Ju Chiang

(57) ABSTRACT

The present application provides an aerosol producing article and an aerosol generating system comprising the aerosol producing article. The aerosol producing article comprises: an aerosol-forming matrix and an external wrapping part; the external wrapping part comprises a first portion, and at least a part of the extension length of the first portion along the axial direction of the aerosol producing article coincides with the extension length of the aerosol-forming matrix; the outer surface of the first portion is provided with a plurality of holes penetrating through the external wrapping part. The above aerosol producing article has optimized infrared transmittance, and can promote the
(Continued)

utilization efficiency of infrared rays when infrared heating is used.

12 Claims, 2 Drawing Sheets

(51) Int. Cl.

| | |
|---|---|
| ***A24D 1/20*** | (2020.01) |
| ***A24D 3/17*** | (2020.01) |
| ***A24F 40/20*** | (2020.01) |
| ***A24F 40/42*** | (2020.01) |
| ***A24F 40/46*** | (2020.01) |
| ***H05B 3/42*** | (2006.01) |

(52) U.S. Cl.

CPC .............. *A24F 40/20* (2020.01); *A24F 40/42* (2020.01); *A24F 40/46* (2020.01); *H05B 3/42* (2013.01); *H05B 2203/032* (2013.01)

(56) References Cited

U.S. PATENT DOCUMENTS

| | | | | |
|---|---|---|---|---|
| 2020/0245679 | A1 * | 8/2020 | Watanabe | A24F 40/20 |
| 2022/0287358 | A1 * | 9/2022 | Kitaoka | D21H 19/20 |
| 2022/0408798 | A1 * | 12/2022 | Prestia | A24D 1/20 |

FOREIGN PATENT DOCUMENTS

| | | | |
|---|---|---|---|
| CN | 109770433 | A | 5/2019 |
| CN | 209120496 | U | 7/2019 |
| CN | 110464056 | A | 11/2019 |
| CN | 110520001 | A | 11/2019 |
| CN | 211910550 | U | 11/2020 |
| EP | 3089606 | | 11/2016 |

* cited by examiner

AEROSOL PRODUCING ARTICLE AND AEROSOL GENERATING SYSTEM

The present application claims priority to Chinese Patent Application No. 202020066742.5, filed with the Chinese Patent Office on Jan. 13, 2020, titled "AEROSOL PRODUCING ARTICLE AND AEROSOL GENERATING SYSTEM".

TECHNICAL FIELD

Embodiments of the present application relate to the field of tobacco products which are incombustible when heated, and in particular, relate to an aerosol producing article and an aerosol generating system.

BACKGROUND

Tobacco products (e.g., cigarettes, cigars, etc.) burn tobacco to produce tobacco smoke during use. Attempts have been made to replace these tobacco-burning products by manufacturing products that release compounds without burning.

An example of such products is a heating device, which release compounds by heating instead of burning a material. For example, the material may be tobacco or other non-tobacco products, and these non-tobacco products may or may not contain nicotine. As another example, an infrared heating device is currently available that heats tobacco products by infrared radiation so that the tobacco products release compounds to generate aerosols. For example, Chinese Patent No. 201821350103.0, as a known technology, proposes a heating device structure in which a nano far infrared coating and a conductive coating are sequentially formed on the outer surface of a quartz tube. After the conductive coating is connected with a power supply for supplying power, the nano far infrared coating generates heat by itself when it is supplied with power, and at the same time, it forms electronic transition to generate far infrared which is radiated on tobacco products in the quartz tube to heat the tobacco products.

However, in the above implementation, the outer wrapping paper of tobacco products used at present is usually obtained by pulping hemp pulp (also blended with part bleached wood pulp or straw pulp) at high viscosity, adding fillers (such as calcium carbonate or limestone powder, etc.), then pressing the materials on a watermark roller on a paper machine or a dry pressing roller outside the machine and drying the materials. Thus, when the tobacco products are heated by infrared radiation, the outer wrapping paper itself absorbs a lot of infrared rays, which on one hand affects the efficiency of temperature rise of the internal tobacco products after infrared absorption.

SUMMARY

In order to solve the problem of infrared utilization efficiency of tobacco products in the prior art, an embodiment of the present application provides an aerosol producing article and an aerosol generating system.

As used herein, the term "aerosol-forming matrix" is used for describing a matrix that can release volatile compounds when heated, and these volatile compounds can form aerosol. The aerosol generated by the aerosol-forming matrix of the aerosol producing article described herein may be visible or invisible, and may comprise vapor (e.g., fine particles of matter, which are in a gaseous state, and these particles are usually liquid or solid at the room temperature) and droplets of gas and condensed vapor.

As used herein, the terms "upstream" and "downstream" are used for describing relative positions of elements, or parts of elements, of an aerosol producing article with respect to the direction in which the user sucks the aerosol producing article during the use thereof.

The aerosol producing article comprises two ends, i.e., a proximal end and a distal end, and the aerosol leaves the aerosol producing article through the proximal end and is delivered to the user. During use, the user may suck at the proximal end to inhale the aerosol generated by the aerosol producing article. During use, the proximal end may also be called the downstream end, and it is downstream of the distal end. The distal end may also be called the upstream end, and it is upstream of the proximal end.

As used herein, the term "aerosol cooling element" is used for describing an element with a relatively large surface area and low suction resistance. During use, the aerosol formed by volatile compounds released from the aerosol-forming matrix passes through the aerosol cooling element before being inhaled by the user, and is cooled by the aerosol cooling element. In contrast with the filter nozzle with high suction resistance and other nozzles, the aerosol cooling element has low suction resistance.

Preferably, the aerosol producing article is a smoke generating article which generates aerosol that may be directly inhaled into lungs of the user through the mouth of the user. More preferably, the aerosol producing article is a smoke generating article which generates nicotine-containing aerosol that may be directly inhaled into the lungs of the user through the mouth of the user.

In a preferred embodiment, the aerosol-forming matrix is arranged at the upstream end of the aerosol producing article.

One embodiment of the present application further provides an aerosol producing article, which comprises:

An aerosol-forming matrix, being configured to generate aerosol for inhalation when heated.

An external wrapping part, extending along an axial direction and surrounding the aerosol-forming matrix.

The external wrapping part comprising a first portion, and at least a part of the extension length of the first portion along the axial direction of the external wrapping part coinciding with the extension length of the aerosol-forming matrix along the axial direction of the external wrapping part.

the outer surface of the first portion being provided with a plurality of holes penetrating through the external wrapping part.

In a preferred embodiment, the external wrapping part comprises a proximal end and a distal end which are opposite in the axial direction.

the area of the holes of the first portion gradually increases in the direction close to the distal end.

In a preferred embodiment, the first portion is one of an aluminum foil, a gold foil, a silver foil, an iron foil, a nickel foil, a graphite thin film, a ceramic paper, mica paper or glass fabric.

In a preferred embodiment, the aerosol-forming matrix comprises particles or strips.

the hole size of the hole is smaller than the particle size of the particle or the length of the strip.

In a preferred embodiment, the hole size of the hole is less than 2 mm.

In a preferred embodiment, the porosity of the holes of the first portion is lower than 70%.

In a preferred embodiment, the porosity of the holes of the first portion ranges from 30% to 50%.

In a preferred embodiment, the thickness of the first portion ranges from 0.1 mm to 0.5 mm.

In a preferred embodiment, the aerosol producing article further comprises:

An aerosol cooling element, being configured to be surrounded by the external wrapping part and located downstream of the aerosol-forming matrix along the axial direction of the external wrapping part.

The external wrapping part comprises a second portion, and at least a part of the extension length of the second portion along the axial direction of the external wrapping part coinciding with the extension length of the aerosol cooling element along the axial direction of the external wrapping part.

the second portion has a lower thermal conductivity than the first portion.

In a preferred embodiment, the aerosol producing article further comprises:

a filter nozzle, being configured to be surrounded by the external wrapping part and located downstream of the aerosol cooling element along the axial direction of the external wrapping part.

An embodiment of the present application further provides an aerosol generating system, which comprises the aerosol producing article that is described above and used in combination with a heating device, and a heating device for heating the aerosol producing article; and the aerosol generating system is characterized in that, the heating device comprises an infrared emitter extending along the axial direction of the aerosol producing article and surrounding the aerosol producing article, and is configured to radiate infrared rays to the aerosol producing article so as to heat the aerosol producing article; and at least a part of the extension length of the infrared emitter along the axial direction of the aerosol producing article coincides with the extension length of the first portion along the axial direction of the aerosol producing article.

The above aerosol producing article has optimized infrared transmittance, and can promote the utilization efficiency of infrared rays when infrared heating is used.

BRIEF DESCRIPTION OF THE DRAWINGS

One or more embodiments are illustrated by pictures in corresponding attached drawings, and this does not constitute limitation on the embodiments. Elements with the same reference numerals in the attached drawings are shown as similar elements, and the pictures in the attached drawings do not constitute scale limitation unless otherwise stated specifically.

DETAILED DESCRIPTION

In order to facilitate the understanding of the present application, the present application will be explained in more detail below with reference to attached drawings and detailed description.

The present application provides a kind of an aerosol producing article which comprises an aerosol-forming matrix, and the aerosol-forming matrix is configured to generate inhalable aerosol when heated by a heating element.

Usually, based on the convenience of smoking for users, the overall appearance of the aerosol producing article is a longitudinal cylindrical structure. In one embodiment of the present application, as shown in FIG. 1, an aerosol producing article comprises three elements arranged in a coaxial arrangement:

an aerosol-forming matrix 10, an aerosol cooling element 20, and a filter nozzle 30; these three elements are arranged in sequence, and are restricted by the external wrapping part 40 to form the aerosol producing article.

Figure 1:
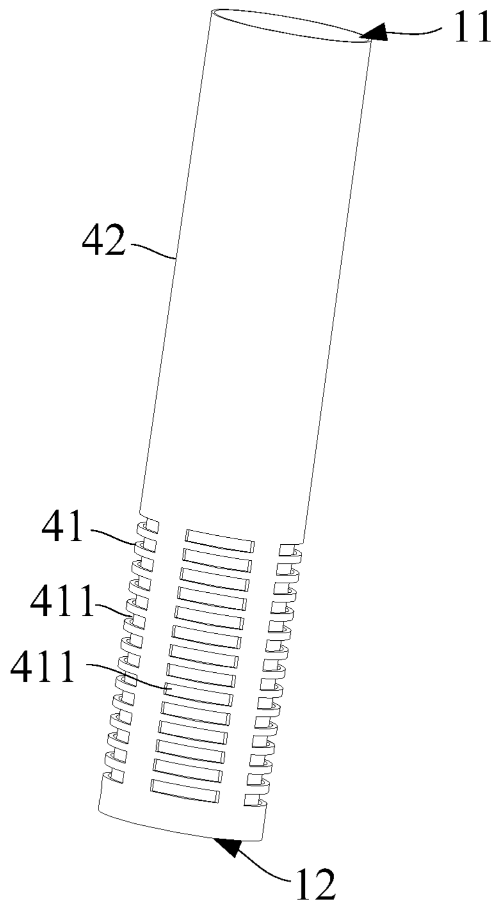
FIG. 1 is an external schematic view of an aerosol producing article provided according to an embodiment.

As further shown in FIG. 1, the aerosol producing article has a proximal end 11 and a distal end 12 which are opposite. During use, the proximal end 11 is inserted into the mouth by the user for suction, and the distal end 12 is arranged at the end of the aerosol producing article opposite to the proximal end 11.

During use, air is inhaled by the user from the distal end 12, and then it passes through the aerosol producing article to reach the proximal end 11. The distal end 12 of the aerosol producing article may also be described as the upstream end of the aerosol producing article, and the proximal end 11 of the aerosol producing article may also be described as the downstream end of the aerosol producing article. Elements of the aerosol producing article arranged between the proximal end 11 and the distal end 12 may be described as being located upstream of the proximal end 11 or alternatively downstream of the distal end 12.

The appearance of the aerosol producing article may imitate the appearance of a conventional smokable cigarette. The aerosol producing article may have an outer diameter between approximately 5 mm and 12 mm (for example, between approximately 6 mm and 8 mm). The aerosol producing article has an overall length between approximately 30 mm and 100 mm, and in a preferred embodiment, the aerosol producing article has an overall length of approximately 45 mm.

The aerosol-forming matrix 10 is arranged at the farthest distal end 12 or upstream end of the aerosol producing article. In the embodiment shown in FIG. 1, the aerosol-forming matrix 10 may comprise, for example, one or more of the following: powder, particles, pellets, chips, strands, strips or flakes, which comprise one or more of the following: grass leaves, tobacco leaves, tobacco main veins, expanded tobacco and homogenized tobacco. In a preferred embodiment, the aerosol-forming matrix 10 comprises an aggregated flake of pleated homogenized tobacco material, and the pleated homogenized tobacco material is restricted by the external wrapping part 40; and the aggregated flake of the pleated homogenized tobacco material comprises glycerin as an aerosol forming agent.

Here, the "homogenized tobacco material" may represent a material formed by agglomerating granular tobacco. In other optional embodiments, the aerosol forming agent is used for describing any suitable and known compound or mixture of compounds, and the suitable and known compound or mixture of compounds promotes the formation of aerosol during use and is generally resistant to thermal degradation at the operating temperature of the aerosol producing article. Suitable aerosol forming agents are known in the art and comprise but not limited to: polyols such as propylene glycol, triethylene glycol, 1,3-butanediol, and glycerin; esters of polyols, such as glycerol mono-, di- or tri-acetate; and aliphatic esters of mono-, di- or poly-carboxylic acids, such as dimethyl dodecanedioate and dimethyl tetradecanedioate. Preferably, the aerosol-forming matrix may have the aerosol forming agent at a content of more than 5% on a dry weight basis.

Alternatively, the aerosol-forming matrix 10 may further comprise tobacco or tobacco-free volatile flavoring compounds which are released when the aerosol-forming matrix 10 is heated. The aerosol-forming matrix 10 may also comprise one or more capsules, which comprise, for example, additional tobacco volatile flavoring compounds or non-tobacco volatile flavoring compounds, and such capsules may be melted during the heating of the aerosol-forming matrix 10.

Optionally, the aerosol-forming matrix 10 may be provided on or embedded in a thermally stable carrier. The carrier may take the form of powder, particles, pellets, chips, strands, strips or flakes. The aerosol-forming matrix 10 may be deposited on the surface of the carrier in the form of flakes, foam, glue or slurry, for example. The aerosol-forming matrix 10 may be deposited on the entire surface of the carrier, or alternatively, it may be deposited with a pattern to provide non-uniform taste delivery during use.

The aerosol cooling element 20 is arranged immediately downstream of the aerosol-forming matrix 10 and is adjacent to the aerosol-forming matrix 10. During use, volatile substances released by the aerosol-forming matrix 10 after being heated flows towards the proximal end 11 of the aerosol producing article along the aerosol cooling element 20, and the volatile substances may be cooled down in the aerosol cooling element 20 to form aerosol inhaled by the user. In the preferred embodiment shown in FIG. 1, the aerosol cooling element 20 comprises a cavity 21, and the first cavity 21 extends along the length of the aerosol cooling element 20. Through the axially extending cavity 21 described above, the air flow passing through the aerosol cooling element 20 is in the longitudinal direction without considerable radial deviation. The aerosol cooling element 20 can play a role in cooling the temperature of the aerosol stream sucked through the aerosol cooling element 20 by means of heat transfer. The components of the aerosol will interact with the space in the aerosol cooling element 20 and lose heat energy.

In some embodiments, the temperature of the aerosol stream may decrease by more than 10 degrees Celsius as it is sucked through the aerosol cooling element 20. In some embodiments, the temperature of the aerosol stream may decrease by more than 25 degrees Celsius or more than 30 degrees Celsius as it is sucked through the aerosol cooling element 20.

The filter nozzle 30 is arranged immediately downstream of the aerosol cooling element 20, and is adjacent to the aerosol cooling element 20. In the embodiment shown in FIG. 1, the filter nozzle 30 comprises a conventional cellulose acetate or polypropylene tow filter tip with low filtration efficiency.

In order to assemble the aerosol producing article, the three elements described above are aligned and tightly wrapped in the external wrapping part 40. In the embodiment shown in FIG. 1, the external wrapping part 40 is a conventional cigarette paper.

The aerosol producing article shown in FIG. 1 is designed to be engaged with a heating device comprising a heating element to facilitate smoking for the user. During use, the heating element of the heating device heats the aerosol-forming matrix 10 of the aerosol producing article to a sufficient temperature to generate aerosol, and the aerosol is sucked downstream through the aerosol producing article and inhaled by the user.

Figure 2:
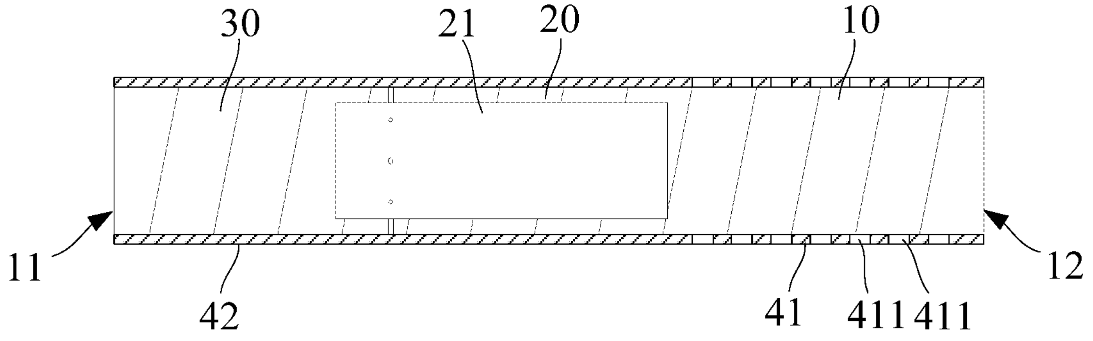
FIG. 2 is a schematic view of the cross-sectional structure of the aerosol producing article shown in FIG. 1.

Further speaking, in a preferred embodiment shown in FIG. 1 and FIG. 2, the external wrapping part 40 comprises:

A first portion 41, being opposite to the aerosol-forming matrix 10 and wrapping the aerosol-forming matrix 10.

A second portion, being opposite to the filter nozzle 30 and the aerosol cooling element 20, and wrapping the filter nozzle 30 and the aerosol cooling element 20.

wherein the first portion 41 is provided thereon with a plurality of holes 411; when the aerosol producing article is heated by infrared radiation, the radiated infrared rays can be absorbed by the external wrapping part 40 as little as possible through the arrangement of these holes 411, so that the aerosol-forming matrix 10 can absorb more infrared rays to generate aerosol and achieve greater infrared utilization efficiency.

In a more preferred embodiment, the first portion 41 of the external wrapping part 40 is made of a material with rigidity and better supporting effect, such as a metal foil including but not limited to an aluminum foil, a gold foil, a silver foil, an iron foil, a nickel foil and an alloy foil of the above elements, or a carbon-based foil (such as graphite paper, graphene, carbon nanotube paper, etc.), mica paper, glass fabric or the like. On the one hand, after the opening of the holes 411 described above, the external wrapping part can still provide proper strength and support as compared to the conventional cigarette, so that the aerosol-forming matrix 10 may be stably wrapped therein. On the other hand, the first portion 41 is noncombustible and it does not decompose or gelatinize at high temperature, and thus safety and the taste of aerosol during smoking can be well maintained.

In a further embodiment, since the second portion 42 of the external wrapping part 40 is wrapped with the aerosol cooling element 20, the second portion 42 may be made of a material with low thermal conductivity, e.g., zirconia ceramic or the like, so as to prevent the temperature of the first portion 41 from being conducted to the second portion 42 in a large amount or quickly. Otherwise, the temperature of the aerosol cooling element 20 will be increased to a relatively high temperature, which affects the function and effect of the aerosol cooling element 20 itself.

In an embodiment, since the aerosol-forming matrix 10 usually takes the form of strips or particles or the like, the hole size of the hole 411 may preferably be smaller than the strip length or particle diameter of the aerosol-forming matrix 10. In a preferred embodiment, it is suitable to adopt a hole size of less than 2 mm so as to prevent the strips or particles of the aerosol-forming matrix 10 from falling out of the hole 411.

In an ideal embodiment, in order to improve the efficiency of infrared ray transmission as much as possible, the higher the area of the hole 411 on the first portion 41 is, the better the effect will be. In an embodiment, it is appropriate that the porosity of the first portion 41 is lower than 70% while ensuring sufficient supporting force. In an optional embodiment, it is preferred to set the porosity of the first portion 41 between 30% and 50%.

In the implementation of the external wrapping part 40 made of the above heat-resistant materials, it is preferred to set the thickness of the first portion 41 between 0.1 mm to 0.5 mm.

Figure 3:
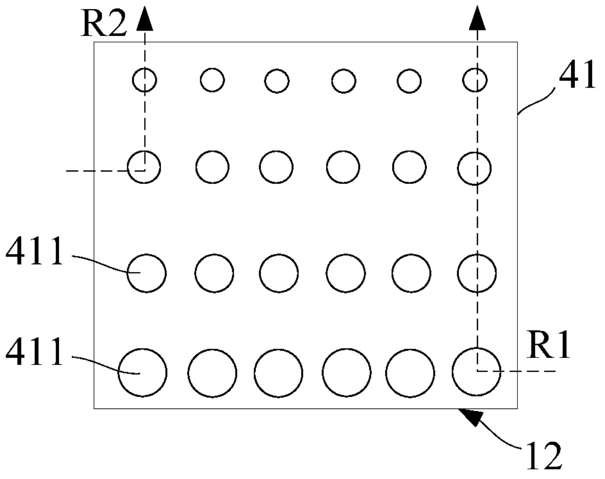
FIG. 3 is an unfolded schematic view of an external wrapping part provided according to another embodiment.

In a preferred embodiment, the shape of the hole 411 described above may be a quadrangle hole as shown in FIG. 1 or a strip-shaped hole. In the case of a preferred embodiment as shown in FIG. 1, an extension length of the quadrangle hole or the strip-shaped hole along a peripheral direction of the aerosol producing article 100 is longer than an extension length of the quadrangle hole or the strip-shaped hole along the axial direction of the aerosol producing article 100. In another variant embodiment, as described with respect to FIG. 3, the hole size of the hole 411 increases gradually in the direction near the distal end 12, and such a design enables the external air to enter the aerosol producing article from the hole 411 near the distal end 12 as much as possible and then carry as much aerosol as possible to flow towards the proximal end 11, as indicated by arrow R1 in FIG. 3. Meanwhile, it prevents large amount of air from entering the aerosol producing article from the hole 411 far away from the distal end 12 and then carrying a relatively small amount of aerosol to flow towards the proximal end 11, as indicated by the arrow R2 in FIG. 3.

Furthermore, the present application further provides an aerosol generating system comprising the aerosol producing article and the heating device described above. In one embodiment, reference may be made to FIG. 4 for the structure of the aerosol generating system. The heating device 200 comprises a heating element 210. [;]

wherein the heating element 210 has a tubular shape, and at least a part of tubular hollow space thereof is configured as a cavity for receiving the aerosol producing article 100. The heating element 210 is an infrared emitter that heats the aerosol producing article 100 by radiating infrared rays to the aerosol producing article.

Figure 4:
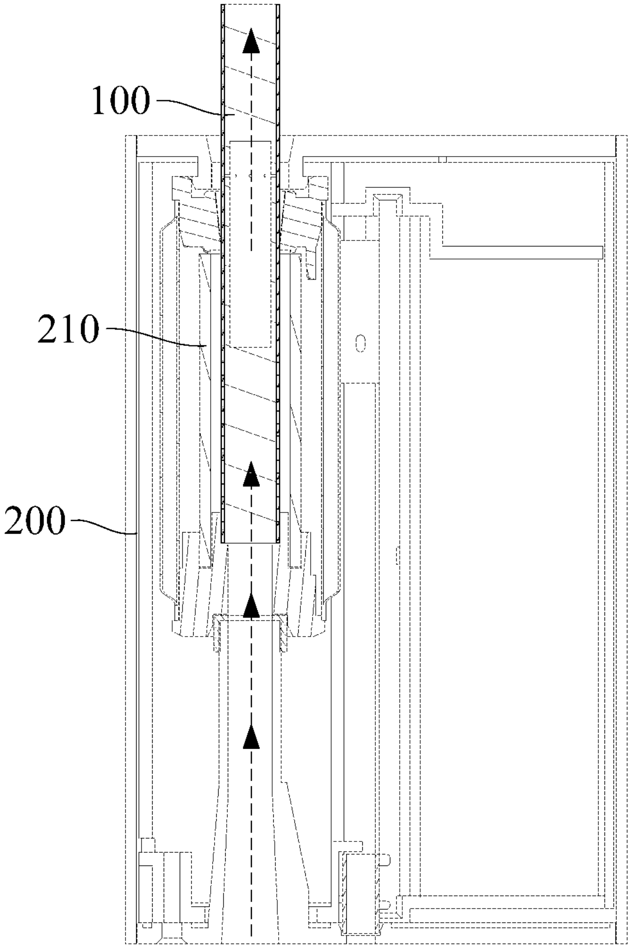
FIG. 4 is a schematic structural diagram of an aerosol generating system provided according to one embodiment.

Base on the implementation in which the infrared emitter heats the aerosol producing article by radiating infrared rays, in the embodiment shown in FIG. 4, the infrared emitter is in a tubular shape that is configured to extend along the axial direction of the aerosol producing article 100 and surround the aerosol producing article 100. At the same time, at least a part of the extension length of the infrared emitter in the axial direction should cover the extension length of the first portion 41 of the aerosol producing article 100, so as to ensure that the emitted infrared rays can be radiated to the aerosol-forming matrix 10 of the aerosol producing article 100 through the first portion 41 and then absorbed, thereby realizing heating.

Based on the comparison of effects, the infrared heating comparison test was performed on cigarette articles which are noncombustible when heated and respectively made of the external wrapping part 40 described above and the conventional non-porous cigarette paper. Specifically, the cigarettes made of the external wrapping part 40 and the conventional cigarette paper are completely the same in other aspects such as dimensions, shapes, compositions and contents of the aerosol-forming matrix 10. Specifically, the cigarette diameter is 5.6 mm and the length is 45 mm, and the aerosol-forming matrix 10 is 15 mm in length. The first portion 41 of the external wrapping part 40 is made of an aluminum foil and opened with holes 411 at a porosity of 50% and a hole size of 1 mm. Then, the two kinds of cigarettes are heated by infrared rays radiated by the heating device 200 shown in FIG. 4. Specifically, the two articles described above are heated by the above heating device 200 at the same output power and heating mode, and the temperature rise efficiency and smoke output effect inside the cigarette articles which are noncombustible when heated in the same heating process are detected.

As a result, the time for the aerosol-forming matrix 10 of the aerosol producing article 100 using the above external wrapping part 40 to rise to the preset preheating temperature of 300 degrees is about 16 s, and the time for the cigarette having the comparative conventional non-porous cigarette paper to rise to the above preheating temperature is about 21 s. Thus, the preheating time is shortened by about 5 s, and the heating rate can be improved by about 20%.

Alternatively, in other variant embodiments, the above heating element 210 using the infrared emitter may also be replaced by a tubular induction heating element adopting electromagnetic inductive heating.

When the above heating element 210 using infrared radiation is adopted for heating, the external wrapping part 40 of the aerosol producing article 100 is made of the above fiber material which is high-temperature resistant and non-combustible, so the external wrapping part 40 will not be gelatinized during heating and thus affect the taste and safety. Moreover, the external wrapping part 40 has an appropriate infrared transmittance, which can promote the effective utilization efficiency of infrared rays when the heating element 210 is used for heating with infrared rays.

It shall be noted that, the specification and attached drawings of the present application show preferred embodiments of the present application. However, the present application is not limited to the embodiments described in this specification. Further speaking, those of ordinary skill in the art can make improvements or variations according to the above description, and all these improvements and variations shall fall within the scope claimed in the appended claims of the present application.

What is claimed is:

1. An aerosol producing article, comprising:

an aerosol-forming matrix, being configured to generate aerosol for inhalation when heated; and an external wrapping part, extending along an axial direction and surrounding the aerosol-forming matrix;

the external wrapping part comprising a first portion, and at least a part of an extension length of the first portion along the axial direction of the external wrapping part coinciding with an extension length of the aerosol-forming matrix along the axial direction of the external wrapping part;

an outer surface of the first portion being provided with a plurality of holes penetrating through the external wrapping part, each of the plurality of holes is a non-circular hole;

wherein a porosity of the first portion with the plurality of holes is lower than 70%.

2. The aerosol producing article according to claim 1, wherein the external wrapping part comprises a proximal end and a distal end which are opposite in the axial direction;

the area of the plurality of holes of the first portion gradually increases in the direction close to the distal end.

3. The aerosol producing article according to claim 1, wherein the first portion is one of an aluminum foil, a gold foil, a silver foil, an iron foil, a nickel foil, a graphite thin film, ceramic paper, mica paper or glass fabric.

4. The aerosol producing article according to claim 1, wherein the aerosol-forming matrix comprises particles or strips;

a hole size of the each of the plurality of holes is smaller than a particle size of each of the particles or a length of each of the strips.

5. The aerosol producing article according to claim 4, wherein the hole size of the each of the plurality of holes is less than 2 mm.

6. The aerosol producing article according to claim 5, wherein a porosity of the first portion with the plurality of holes ranges from 30% to 50%.

7. The aerosol producing article according to claim 1, wherein a thickness of the first portion ranges from 0.1 mm to 0.5 mm.

8. The aerosol producing article according to claim 1, further comprising:

an aerosol cooling element, being configured to be surrounded by the external wrapping part and located downstream of the aerosol-forming matrix along the axial direction of the external wrapping part;

the external wrapping part comprises a second portion, and at least a part of the extension length of the second portion along the axial direction of the external wrapping part coinciding with the extension length of the aerosol cooling element along the axial direction of the external wrapping part;

the second portion has a lower thermal conductivity than the first portion.

9. The aerosol producing article according to claim 8, further comprising:

a filter nozzle, being configured to be surrounded by the external wrapping part and located downstream of the aerosol cooling element along the axial direction of the external wrapping part.

10. An aerosol generating system, comprising the aerosol producing article according to claim 1, and a heating device for heating the aerosol producing article; the heating device comprising an infrared emitter extending along the axial direction of the aerosol producing article and surrounding the aerosol producing article, and being configured to radiate infrared rays to the aerosol producing article so as to heat the aerosol producing article; and at least a part of the extension length of the infrared emitter along the axial direction of the aerosol producing article coinciding with the extension length of the first portion along the axial direction of the aerosol producing article.

11. The aerosol producing article according to claim 1, wherein the each of the plurality of holes is a quadrangle hole or a strip-shaped hole.

12. The aerosol producing article according to claim 11, wherein an extension length of the quadrangle hole or the strip-shaped hole along a peripheral direction of the aerosol producing article is longer than an extension length of the quadrangle hole or the strip-shaped hole along the axial direction of the aerosol producing article.

* * * * *